United States Patent [19]

Hicks

[11] 3,731,141
[45] May 1, 1973

[54] ROAD VEHICLE LIGHTING SYSTEMS

[76] Inventor: Harris Vernon Hicks, 61 Ferndale Road, Lichfield, England

[22] Filed: Nov. 15, 1971

[21] Appl. No.: 198,534

[30] Foreign Application Priority Data

Nov. 20, 1970 Great Britain......................55,209/70

[52] U.S. Cl. ..................................................315/83
[51] Int. Cl. ...............................................B60q 1/14
[58] Field of Search..................................315/82, 83

[56] References Cited

UNITED STATES PATENTS 2,965,798   12/1960   Cade ........................................315/83

Primary Examiner—Roy Lake
Assistant Examiner—James B. Mullins
Attorney—Holman & Stern

[57] ABSTRACT

A road vehicle lighting system has first and second dipped beam headlamps, one main beam headlamp and a projector receiver unit which replaces the second main beam headlamp. The unit projects a divergent beam of light, and cuts off sufficient of that beam to prevent dazzling an oncoming driver. The normal dip switch is employed but is arranged to energize the projector-receiver unit in both positions of the dip switch, and when the dip switch is in its second position the minimum strength of the signal required by the receiver to operate the projector receiver unit is increased.

2 Claims, 4 Drawing Figures

ROAD VEHICLE LIGHTING SYSTEMS

This invention relates to road vehicle lighting systems.

The term "projector-receiver unit" is used herein to denote a unit including a light projector for projecting forwardly a well-defined, divergent beam of light of generally rectangular cross-section, a light receiver for receiving light from a light source in front of the unit, and means responsive to light received by the receiver for cutting off sufficient of the projected beam, from one side of the beam, to ensure that the beam does not fall on said light source.

A road vehicle lighting system according to the invention comprises in combination first and second dipped beam headlamps, a main beam headlamp, a projector-receiver unit, a dip switch having a first position in which it energises the dipped beam headlamps, and a second position in which it energizes the main beam headlamp, means whereby the projector-receiver unit is energized in both positions of the dip switch, and means operable when the dip switch is in its second position for increasing the minimum strength of the signal required by the receiver to operate the projector-receiver unit.

Figures 1, 2:
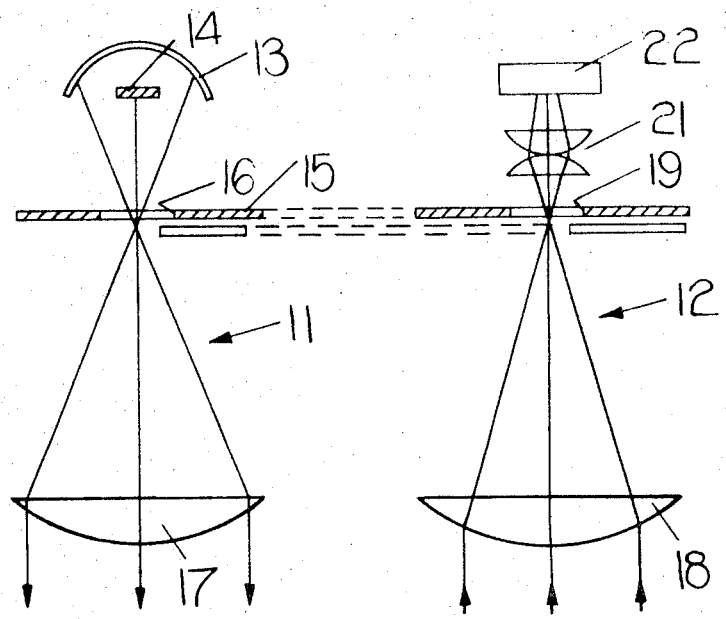
Figure 4:
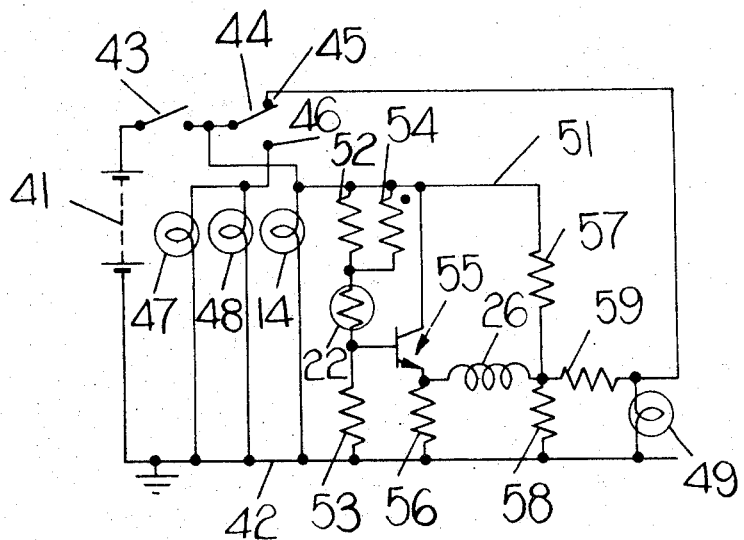
Figure 3:
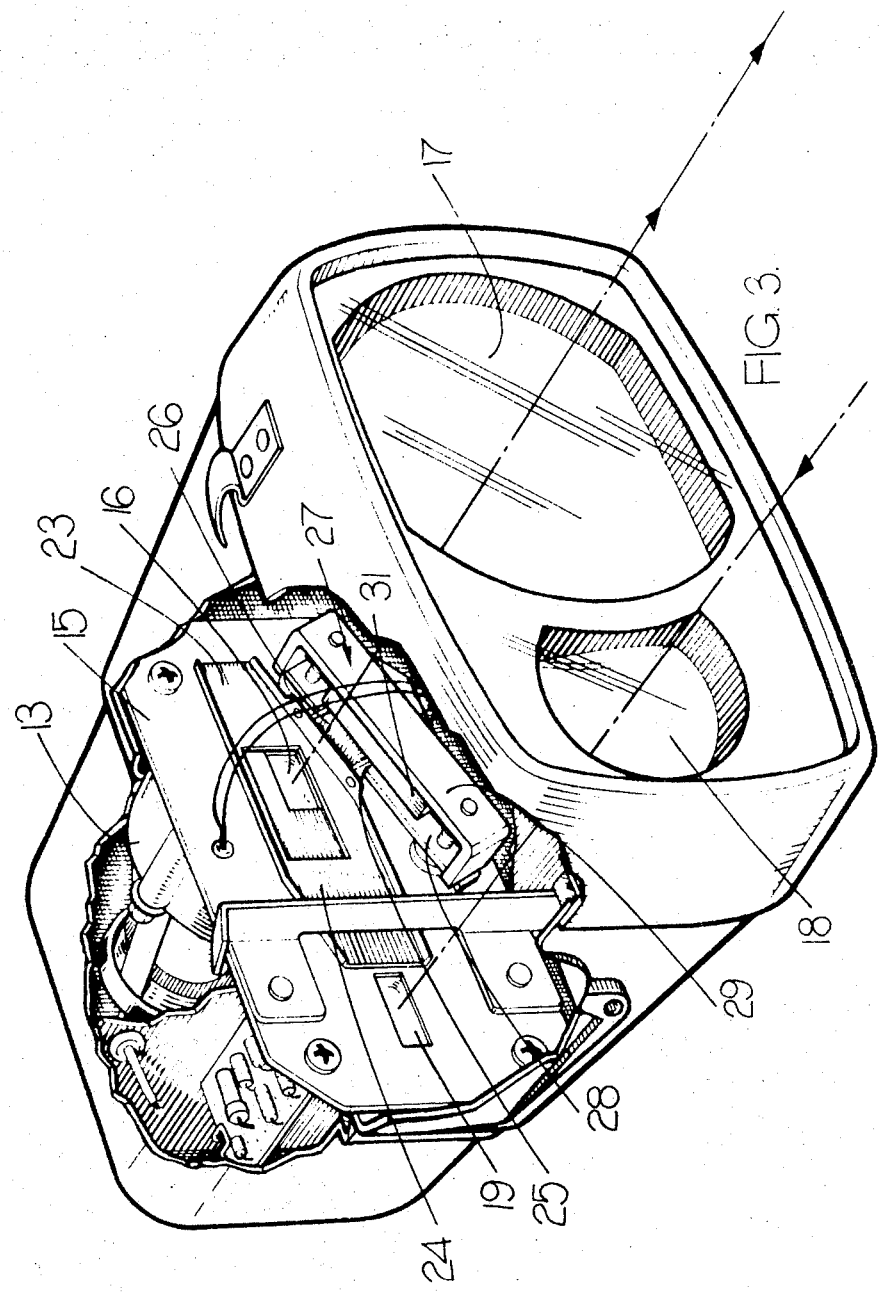

An example of the invention is illustrated in the accompanying drawings, in which FIGS. 1 and 2 are optical diagrams respectively of the projector and receiver of a projector-receiver unit, FIG. 3 is a diagrammatic representation of part of the control apparatus of the projector-receiver unit, and FIG. 4 is a circuit diagram.

Referring to FIGS. 1 to 3, the projector-receiver unit includes a casing housing a light projector 11 and a light receiver 12. The projector 11 includes a high intensity bulb, and an elipsoidal mirror 13. The filament 14 of the bulb is positioned at one focus of the mirror 13, and the bulb is so positioned that the other focus of the mirror 13 occurs in an aperture 16 of a mask 15. Positioned on the side of the mask 15 remote from the bulb is a plano-convex lens 17 the spacing between the lens 17 and the mask 15 being equal to the focal length of the lens 17. The aperture 16 is rectangular, and so a well defined image of the aperture 16 is projected forwardly to constitute a divergent beam of light of accurately rectangular cross section. Thus when the unit is positioned on the front of a road vehicle, then the beam of light illuminates the road in front of the vehicle.

The receiver 12 includes a plano-convex lens 18 which receives light from in front of the receiver, and which produces an image in a rectangular aperture 19 in the mask 15. Light passing through the aperture 19 falls on a condensor lens system 21 which directs the light onto the sensitised surface of a photo cell 22. The arrangement is such that an image of the lens 18 falls on and almost fully covers the sensitized surface of the photo cell 22. In this way, the image of the lnes 18 falls centrally on the photo cell 22 irrespective of the position of the image in the aperture 19. If the image falls outside the aperture 22, no light falls on the cell.

Movable across the apertures 16, 19 respectively are a pair of shutters 23, 24 which are interconnected so as to move simultaneously. In practice, the shutters 23, 24 are integral with one another. The shutters 23, 24 are carried by a spool 25 which also carries a winding 26. Extending through the spool 25 is one inclined limb 28 of a rectangular soft iron frame 27. The limb 29 of the frame 27 opposite the limb 28 has secured thereto a ferrite magnet 31, the magnet 31 being housed between the limbs 28, 29 and the width of the magnet 31 being substantially equal to the length of the limb 29. The north pole of the magnet 31 is in contact with the limb 29 and since the frame 27 is a closed circuit then the whole of the frame 27 is of north polarity with respect to the south pole of the magnet 31. The south pole of the magnet 31 is spaced from the limb 28 of the frame 27 by an air gap, and so part of the magnetic field of the frame 27 and magnet 31 extends between the limb 28 and the south pole of the magnet 31 at right angles to the limb 28. The winding 26 is wound around the spool 25, and so the limb 28 passes through the winding.

Electrical connections are made to the winding 26 by way of fine copper pig-tails and the spool 25 can slide along the limb 28. The spool 25, and consequently the shutters 23, 24 is urged by gravity towards the lower end of the limb 28, that is to say to a position wherein the apertures 16, 19 are covered.

In use when the unit is switched on, the winding 26 is energised to move the spool up the limb 28 and so completely uncover the apertures. When light falls on the photo cell 22, the photo cell 22 produces an output which controls current flow in the winding 26, so that the spool 25 moves longitudinally down the limb 28 of the frame 27, thereby moving the shutters 23, 24 in a direction to progressively cover their respective apertures 16, 19. The shutters 23, 24 continue to move, until the leading edge of the shutter 24 covers that portion of the aperture 19 in which the image of the remote light source (for example the headlamp of an oncoming vehicle) is falling. When this position is reached the photo cell 22 ceases to produce an output, and the shutters 23, 24 start to return to their original positions until that portion of the aperture 19 into which the image of the remote source falls is again uncovered, whereupon the photo cell 22 again produces an output. Thus the spool 25 and the shutters 23, 24 will hunt about a position wherein the leading edge of the shutter 24 masks the image of the lens 18 falling in the aperture 19. The amplifier of the unit is so designed as to provide some measure of damping, and if required mechanical damping can also be provided. While the shutter 24 is masking part of the aperture 19, the shutter 23 will of course be masking part of the aperture 16, and since the width of the projected beam of light is dependent upon the width of the apertures 16, then the position of the shutter 23 relative to the aperture 16 will determine the width of the projected beam. Thus as the shutter 23 moves across the aperture 16 the projected beam will be progressively cut off from one side of the beam. The correlation between the projector 11 and the receiver 12 is such that sufficient of the projected beam is cut off to ensure that the projected beam does not fall on the light source seen by the receiver. In the case where the light source seen by the receiver is the headlights of an oncoming vehicle, then the projected beam will be cut off sufficiently to prevent the beam falling on the driver of the oncoming vehicle, thereby minimizing the risk that the driver of the oncoming vehicle will be dazzled. When the unit is turned off, the spool 25 moves under gravity to the lower end of the limb 28 so that the apertures are closed, and saturation of the photocell 22 by daylight is prevented.

It will be appreciated that the shutters 23, 24 can be so arranged that the projected beam is cut off from either side thereof, that is to say the projected beam can be cut off from its left side, in one unit, while in a second unit the arrangement can be such that the beam is cut off from its right side.

The projector-receiver unit is employed in a four headlamp system comprising a pair of dipped beam headlamps, a main beam headlamp and the projector-receiver unit. Referring to the circuit diagram shown in FIG. 4, the vehicle battery 41 has its negative terminal connected to an earth supply line 42, and its positive terminal connected through a main lighting switch 43 to the movable contact of a dip switch 44 having a pair of fixed contacts 45, 46. The contact 46 is connected to the line 42 through the dipped beam headlamps 47, 48 in parallel, and the contact 45 is connected to the line 42 through the main beam headlamp 49. The junction of the switch 43 and contact 44 is connected to a supply line 51, and the filament 14 of the projector-receiver unit is connected between the line 51 and the line 42. Also connected between the lines 51, 42 in series are a resistor 52, the photo cell 22 and the a resistor 53, the resistor 52 being bridged by a thermistor 54 which compensates for temperature variations The junction of the photo cell 22 and resistor 53 is connected to the base of an n-p-n transistor 55, the collector of which is connected to the line 51 and the emitter of which is connected to the line 42 through a resistor 56, also connected between lines 51, 42 are a pair of resistors 57, 58 in series, the junction of the resistors 57 and 58 being connected to the emitter of the transistor 55 through the winding 26, and further being connected through a resistor 59 to the contact 45.

When the main lighting switch 43 is closed, then assuming that the contact 44 engages the contact 46, the dipped beam headlamps 47 and 48 are energized, and the line 51 is also energized, so that the projector-receiver unit is energized. At this stage current can flow from the line 51 through the resistors 57 and 59 and the main beam headlamp 49 in series to the line 42, but this current flow is insufficient to energize the headlamp 49. The bridge network 55, 56, 57, 58 controls current flow through the winding 26 in accordance with the conduction of the transistor 55, which in turn is controlled by the photo cell 22, and the projector-receiver unit acts as previously described to prevent dazzling the driver of an oncoming vehicle. The various resistance values are chosen so that the projector-receiver unit operates to avoid dazzling the driver of the oncoming vehicle.

When the contact 44 is moved into engagement with the contact 45, the dipped beam headlamps 57 and 48 are extinguished, but the main beam headlamp 49 is energized. The line 51 is still energized of course, and so the projector-receiver unit is still in operation. However, current flowing from the contact 45 through the headlamp 49 alters the current flow through the resistor 59, with the effect that the minimum strength of the signal required to operate the shutters is increased, and in one particular example is doubled. The reason for this is that it is found that if the projector-receiver unit is used in a system as described with a main beam headlamp, then on bends in the road, reflections caused by the main beam headlamp can cause the shutters 23 and 24 to partly close, even though there is no vehicle approaching. Clearly this problem could be solved by arranging that the projector-receiver unit has its shutters fixed when the main beam position is selected, so that the unit merely acts as a main beam headlamp, it being appreciated that when the main beam position is selected, there is no necessity for the shutters to be moved since there should not be any oncoming traffic. However, if the shutters are fixed in these circumstances, the photo cell 14 can become saturated by extremely bright illumination, and is then slow to respond when the dipped beam position is selected again. By altering the sensitivity of the projector-receiver unit as described, it is found that the shutters will not normally close during main beam operation, so that in effect a second main beam headlamp is provided. However, if bright illumination is encountered, then the shutters will close to prevent saturation of the photo cell 22.

I claim:

1. A road vehicle lighting system comprising in combination first and second dipped beam headlamps, a main beam headlamp, a dip switch having a first position in which it energizes the dipped beam headlamps, and a second position in which it energizes the main beam headlamp, a light projector for projecting forwardly a well defined, divergent beam of light of generally rectangular cross-section, circuit means coupling said light projector to said dip switch whereby said light projector is energized in both positions of the dip switch, a light receiver for receiving light from a light source in front of the road vehicle, a winding which when energized movesa pair of shutters, one of the shutters serving to cut off said divergent beam of light progressively, and the other of said shutters serving progressively to block light from said light source in front of the road vehicle from entering said light receiver, said light receiver incorporating a photo-cell on which light from said light source falls under the control of said other shutter, a bridge network having an output coupled to said winding, said photo-cell serving to determine the resistance of one limb of said bridge network whereby to determine the position of said shutters, so that said one shutter cuts off sufficient of the projected beam to ensure that said beam does not fall on said light source, the system further including circuit means which is energized under the control of said dip switch at the same time as said main beam headlamp for increasing the minimum strength of the signal which must fall on said photo-cell to energize the winding and thereby move said shutters, whereby said receiver is less sensitive to oncoming light when the dip switch is in its second position than when the dip switch is in its first position.

2. A system as claimed in claim 1 in which the circuit means operable at the same time as the main beam headlamp is energized comprises a circuit connection across one element of the bridge network, said circuit connection including the main beam headlamp, so that when the main beam headlamp is illuminated, the setting of the bridge network is altered.

* * * * *